United States
Hayosh et al.

4,025,761
May 24, 1977

[54] OPTICAL SYSTEM FOR CODE SYMBOL SCANNERS

[75] Inventors: Thomas David Hayosh, Bloomfield Hills; John Henry Carosella, Avon Township, both of Mich.

[73] Assignee: Schiller Industries, Inc., Cullman, Ala.

[22] Filed: Oct. 6, 1975

[21] Appl. No.: 619,991

Related U.S. Application Data

[63] Continuation-in-part of Ser. No. 568,808, April 16, 1975, which is a continuation-in-part of Ser. No. 466,769, May 3, 1974, abandoned.

[52] U.S. Cl. .................. 235/61.11 E; 250/566; 340/146.3 Z; 350/7
[51] Int. Cl.² ................ G06K 7/14; G06K 9/12; G02B 27/17
[58] Field of Search .......... 250/566, 567, 568, 569, 250/216, 235; 235/61.11 E, 61.11 R, 61.7 R; 340/146.3 Z, 146.3 AH, 146.3 F; 350/6, 7; 356/158

[56] References Cited
UNITED STATES PATENTS

| | | | |
|---|---|---|---|
| 3,360,659 | 12/1967 | Young | 356/158 |
| 3,744,026 | 7/1973 | Wolff | 340/146.3 Z |
| 3,754,212 | 8/1973 | Borsboom | 340/146.3 K |
| 3,758,783 | 9/1973 | Sick | 235/61.11 E |
| 3,762,791 | 10/1973 | Fournier | 350/6 |
| 3,916,158 | 10/1975 | Sansone | 235/61.11 E |
| 3,919,527 | 11/1975 | Bowen | 250/566 |

*Primary Examiner*—Robert M. Kilgore
*Attorney, Agent, or Firm*—Reising, Ethington, Barnard

[57] ABSTRACT

A laser scanner is disclosed which is especially adapted as a label reader for point-of-sale data processing systems. The scanner produces a polyphase scan pattern. The scanning beam is vertically deflected as a sinuosoidal function of time by an oscillatory mirror and is horizontally deflected as a sawtooth function of time by a rotary multifaceted mirror. The return light signal follows an optical path including the rotary multifaceted mirror which causes "derotation" of the image before it impinges upon the receiving photodetector. Additionally, the ambient or background light is reduced by providing an optical slit in the receiving optics so that the vertical deflection is accommodated.

6 Claims, 11 Drawing Figures

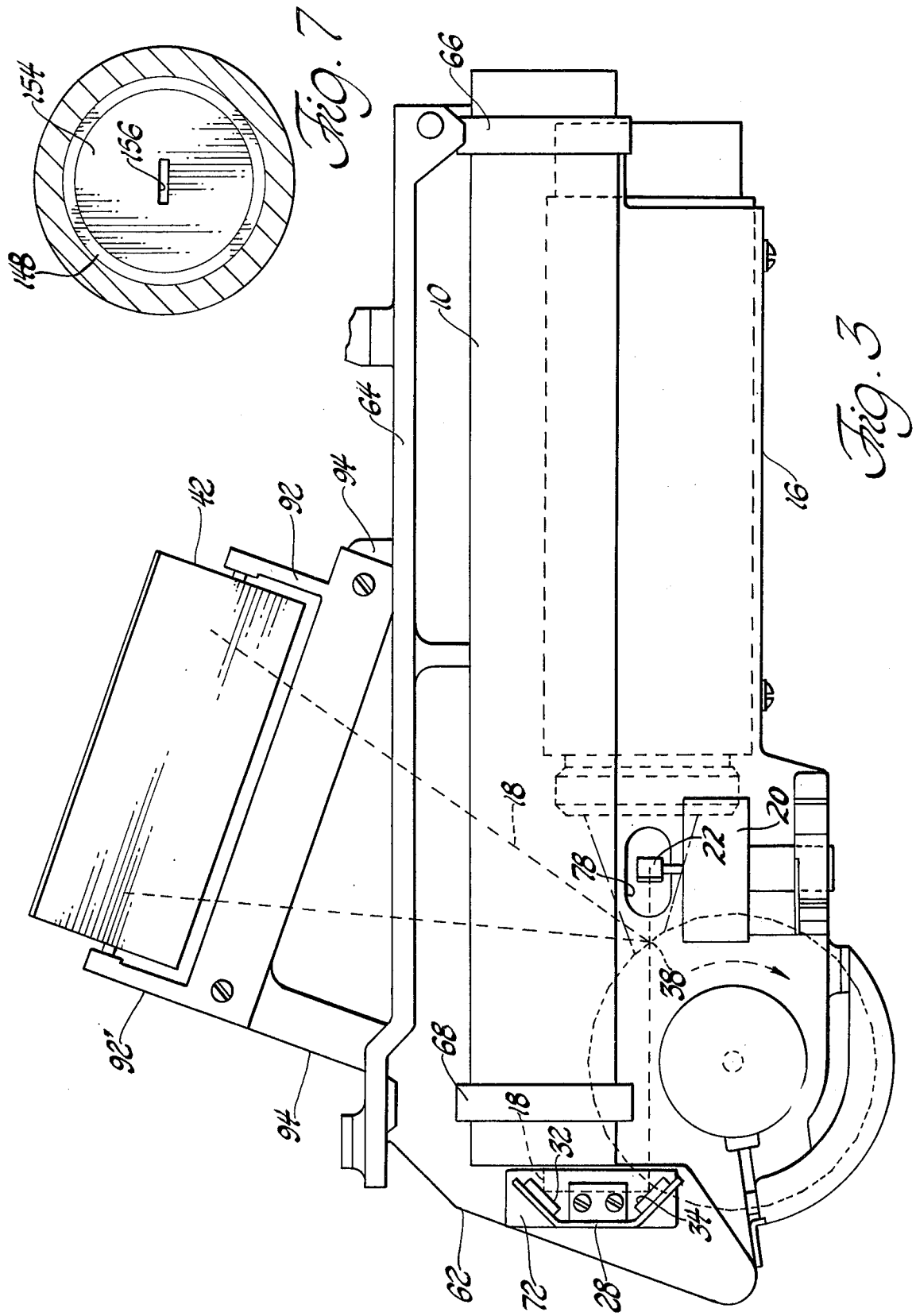

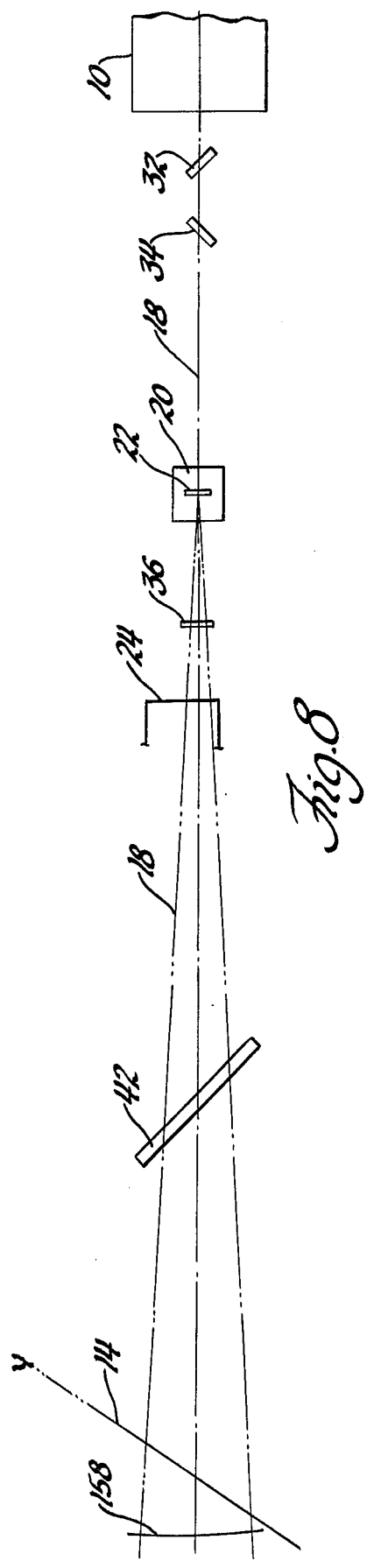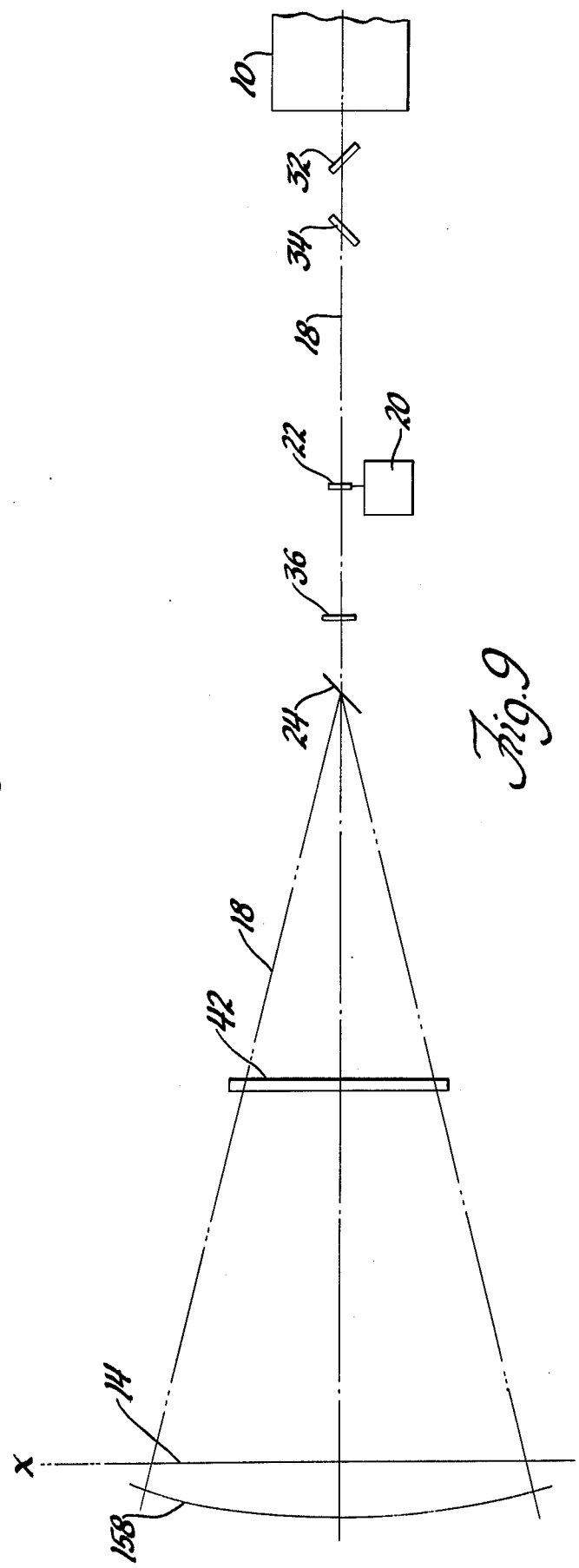

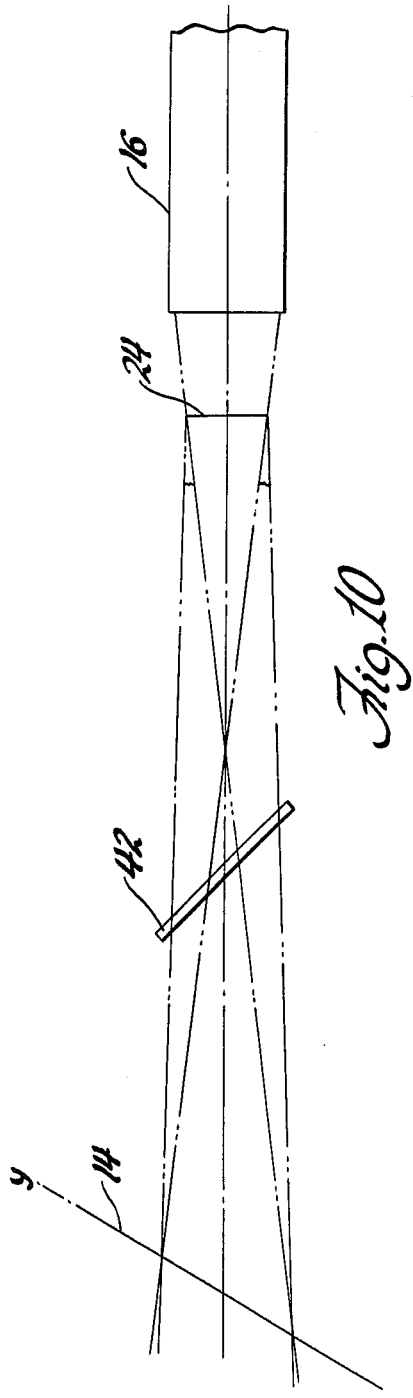
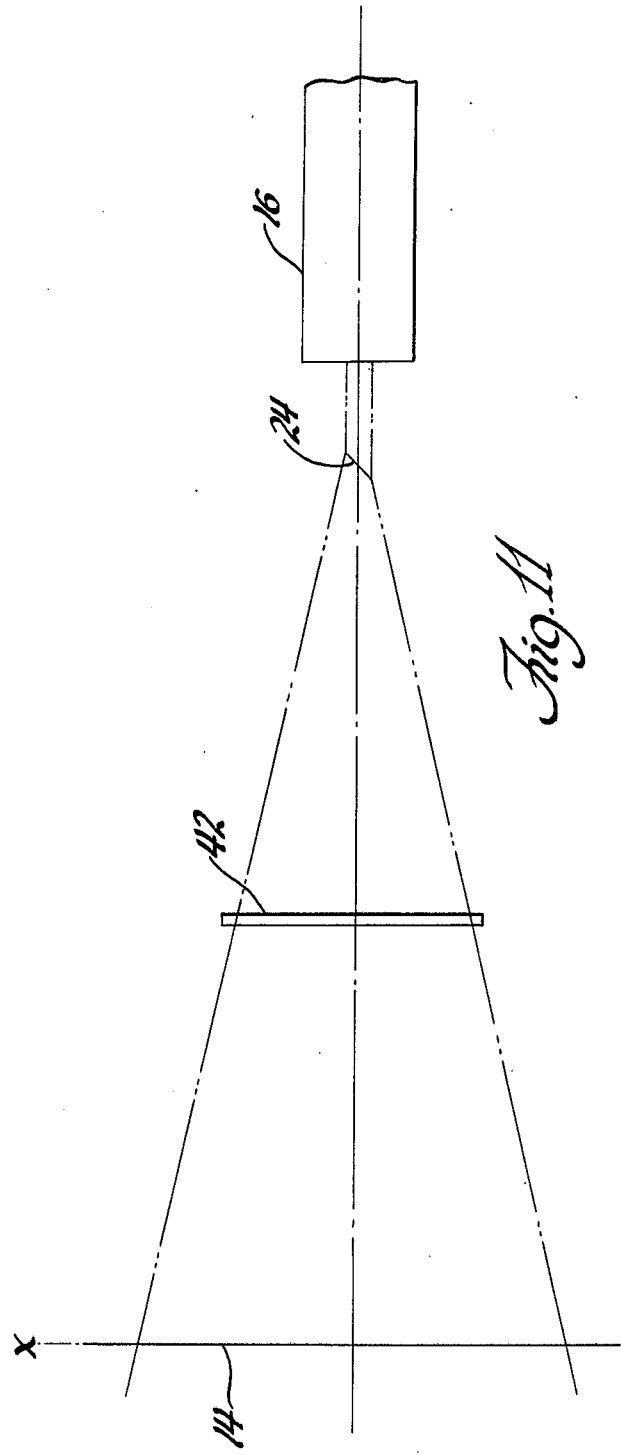

4,025,761

OPTICAL SYSTEM FOR CODE SYMBOL SCANNERS

This is a continuation-in-part of patent application Ser. No. 568,808 filed Apr. 16, 1975 and entitled Polyphase Scanner for Bar Code Symbols which is a continuation-in-part of Ser. No. 466,769, filed May 3, 1974 now abandoned. The entire disclosure of Ser. No. 568,808 is incorporated by reference into this patent application.

FIELD OF THE INVENTION

This invention relates to code readers and more particularly to an optical scanner and receiver system for a code reader.

BACKGROUND OF THE INVENTION

Automatic data processing at the point-of-sale in supermarkets and other retail stores has been accomplished using a code reader which is interconnected with data processing means.

The code reader, which includes an optical scanner and receiver system, is placed at the checkstand to read code symbols on packages being transferred across the counter. The scanner and receiver generate electronic signals corresponding to the data stored in the code symbol and the signals are utilized as data input for an electronic cash register system. This kind of automated checkstand has been developed in connection with the adoption by the Uniform Products Code Council of the Universal Products Code (UPC) symbol. The UPC symbol is of bar code format and is printed on the package of the associated product.

The prior art includes optical code readers for use in automated checkstands. The Connell U.S. Pat. No. 3,818,444 discloses a system comprising a laser, a beam splitter and a pair of rotary multifaceted mirrors to produce a scanning beam. A photodetector is provided to receive the light returned from the scanned symbol and produce an electronic signal corresponding to the data represented by the symbol. Other optical code readers are shown in the Myer U.S. Pat. No. 3,718,761 and the Munson U.S. Pat. No. 3,728,677.

BRIEF SUMMARY OF THE INVENTION

According to this invention, an optical scanner and receiver system is provided which maximizes the light signal collection at the receiver and rejects the ambient light. This is accomplished by providing a return light path which retraces the outgoing beam path through at least a portion of the beam deflector means. Preferably, the beam deflector means includes a rotary scanner in the form of a multifaceted mirror to deflect the beam along a major axis and an oscillatory mirror to deflect the beam along a minor axis to produce a polyphase scan pattern at the reading window. The return light path from the reading window to the receiving means includes the rotary scanner and this produces "de-rotation," i.e. the image represented by the return light has no component of motion relative to the photodetector corresponding to the motion of the rotary scanner. Accordingly, the area of the reading field to be viewed by the signal receiver is reduced to a narrow band just wide enough to encompass the beam impinging upon the code symbol and long enough to encompass the beam path along the minor axis. This greatly reduces the amount of ambient light which would otherwise be received by the photodetector. For this purpose, the receiver comprises an aperture plate having a slit extending in the direction of the minor axis and a light collecting lens in the path between the rotatable scanner and the aperture plate.

Further, according to this invention, an optical scanner and reader are combined as an integrated system in a unitary assembly. The scanner-receiver assembly is suitably provided with a casing of rectangular shape and is of small size and especially adapted to be mounted in the counter of a supermarket checkstand. In particular, one side of the casing comprises a cover plate which contains a reading window and which is adapted to serve as a portion of the counter top of the checkstand. This is accomplished by using a folded optical system wherein a light beam source and a receiver are mounted with parallel axes in side-by-side relation with a rotary scanner having its rotational axis perpendicular thereto, the rotary scanner being aligned with the axis of the receiver. A beam folding or post mirror is disposed between the rotary scanner and the receiver and has a reflective surface in the beam path and presents a small obscuration in the return light path to the receiver. The oscillatory mirror is disposed in the beam path between the light source and the post mirror. A final folding mirror in the beam path and the return light path is disposed between the rotary scanner and the window which is mounted in the aforementioned cover plate of the casing.

DETAILED DESCRIPTION OF THE INVENTION

A more complete understanding of the invention may be obtained from the detailed description that follows, taken with the accompanying drawings in which:

FIG. 3 is a view taken on lines 3—3 of FIG. 2;

FIG. 7 is a view taken on lines 7—7 of FIG. 6.

FIGS. 8, 9, 10 and 11 shows the optical components and paths in schematic fashion.

Figure 1:
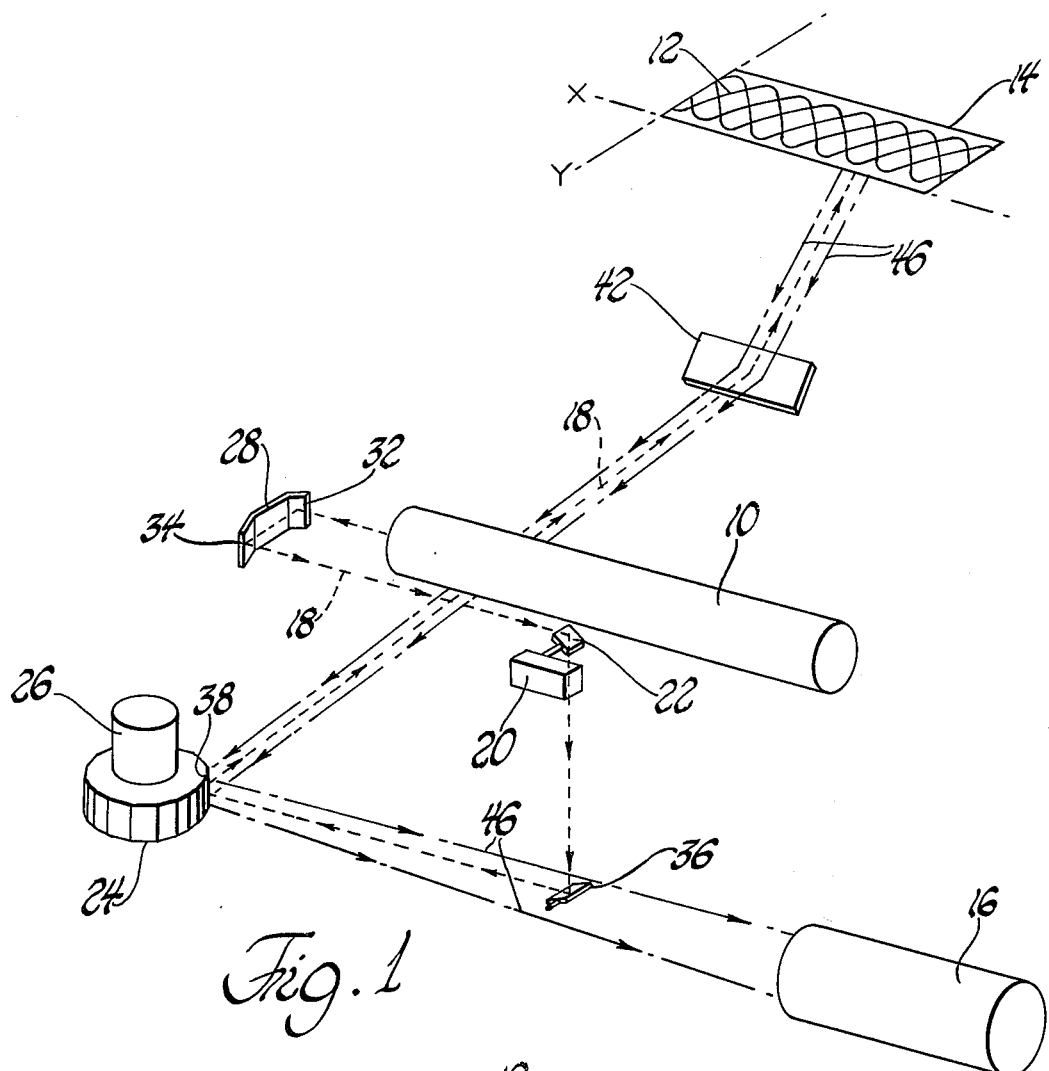
FIG. 1 is a schematic diagram of the optical system.
Figure 4:
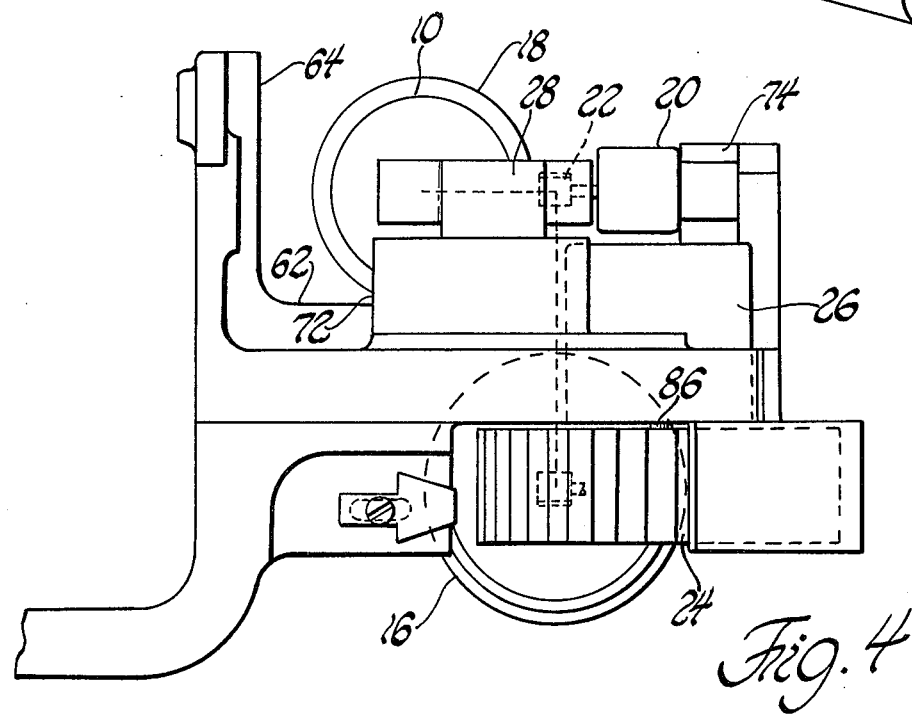
FIG. 4 is a view takan on lines 4—4 of FIG. 2.

Referring now to the drawings, there is shown an illustrative embodiment of the invention in a code reader especially adapted for reading UPC code symbols. The code reader is illustrated in an embodiment adapted for countertop installation for use in point-of-sale data processing, such as a supermarket checkstand in which the code reader supplies data for an electronic cash register and computer.

The code reader of this invention is shown schematically in FIG. 1. The reader comprises an optical scanner including a laser 10 and other components which produce a predetermined light beam scan pattern 12 on a reading window 14. The reading window 14 is suitably disposed in a countertop and items carrying a code symbol are moved across the window with the symbol exposed to the scan pattern for reading. The scan pattern 12, in the illustrative embodiment, is a polyphase scan pattern especially adapted for omni-directional reading of a UPC code symbol as set forth in the above-identified patent application Ser. No. 568,808. The code reader also comprises a light signal receiver 16 which collects a portion of the light scattered by impingement of the scanning beam on the code symbol being scanned and produces an electrical signal corresponding to the encoded data. As will be described below, a part of the return light path is along the same line and same optical components as the outgoing scanning beam path.

Referring now to FIG. 1 in greater detail, the scanner comprises laser 10 which is preferably a helium-neon laser which produces a coherent beam in the visible portion of the spectrum; it includes beam forming means which enables a focused spot to be produced in the vicinity of the window 14. The scanner includes beam deflector means comprising an electromechanical resonator 20 which has a mirror 22 mounted thereon to produce an oscillatory scanning motion of the beam along a minor axis, $y$, of the reading window 14. The beam deflector means also includes a rotary multifaceted mirror 24 driven at a constant speed by a rotary motor 26. The rotary mirror 24 produces an oscillatory or sawtooth scanning motion of the beam along a major axis, $x$, of the reading window 14.

The optical system of the scanner is folded to permit the components to be installed in a small space. The beam path 18 for the scanner extends from the laser 10 to a beam folding or corner reflector 28 which has mirror elements 32 and 34 disposed at right angles to each other. The beam path extends from the mirror element 32 to the mirror element 34 and thus is folded back in a direction parallel to the longitudinal axis of the laser 10. The beam path includes the oscillatory mirror 22 and is thereby deflected in a plane which is substantially parallel to the longitudinal axis of the laser 18. The beam path from the mirror element 34 includes a beam folding or post mirror 36 which is large enough to accommodate the full extent of the angular sweep of the beam produced by the oscillatory mirror 22. The post mirror 36 redirects the beam path in a direction substantially parallel to the longitudinal axis of the laser 18 until it impinges upon one of the facets 38 of the rotary mirror 24. The oscillatory displacement of the mirror 22 causes the beam to sweep across the particular facet 38 of the rotary mirror 24 which is in the beam path. The mirror 24 has an axial dimension sufficient to accommodate the angular sweep of the beam. The rotational axis of the rotary mirror 24 is disposed substantially perpendicularly to the longitudinal axis of the laser 18. The beam path of the scanner extends from the particular facet 38 of the rotary mirror 24 in a direction approximately perpendicular to the axis of the laser 18 to a final folding mirror 42. Mirror 42 is large enough to accommodate the full sweep of the scanning beam and is inclined at a suitable angle to reflect the beam onto the reading window 14. As will be explained below, the final folding mirror 42 is positioned in the beam path so that the plane of best focus of the scanning beam is inclined relative to the reading window 14 and disposed somewhat above the window.

The light signal receiver 16 is disposed with its longitudinal axis parallel to the longitudinal axis of the laser 10 and in substantial alignment with the scanning beam path extending from the post mirror 36 to the rotary mirror 24. The signal collection system includes a return light path extending from the code symbol at the reading window 14 to the receiver 16. The scattered light which results from impingement of the scanning beam upon the code symbol is returned through the reading window 14 along a path 46. This path includes the final folding mirror 42 and thence extends to the particular facet 38 of the rotary mirror 24. The return light path then extends directly to the input end of the light receiver 16. It is noted that the post mirror 36 constitutes an obscuration in the return light path. However, the cross-sectional area of this mirror is so small relative to the cross-sectional area of the return light path, that the signal loss caused thereby is small. The signal collection system will be described further below with reference to the structural arrangement of the scanner and receiver.

The structural arrangement of the scanner and receiver system is shown in FIGS. 2, 3, 4, 5 and 6. As illustrated in these figures, the optical components are mounted upon a support frame 50 which is disposed within a casing 60. The supporting arrangement for the optical components will now be described in detail.

Figure 2:
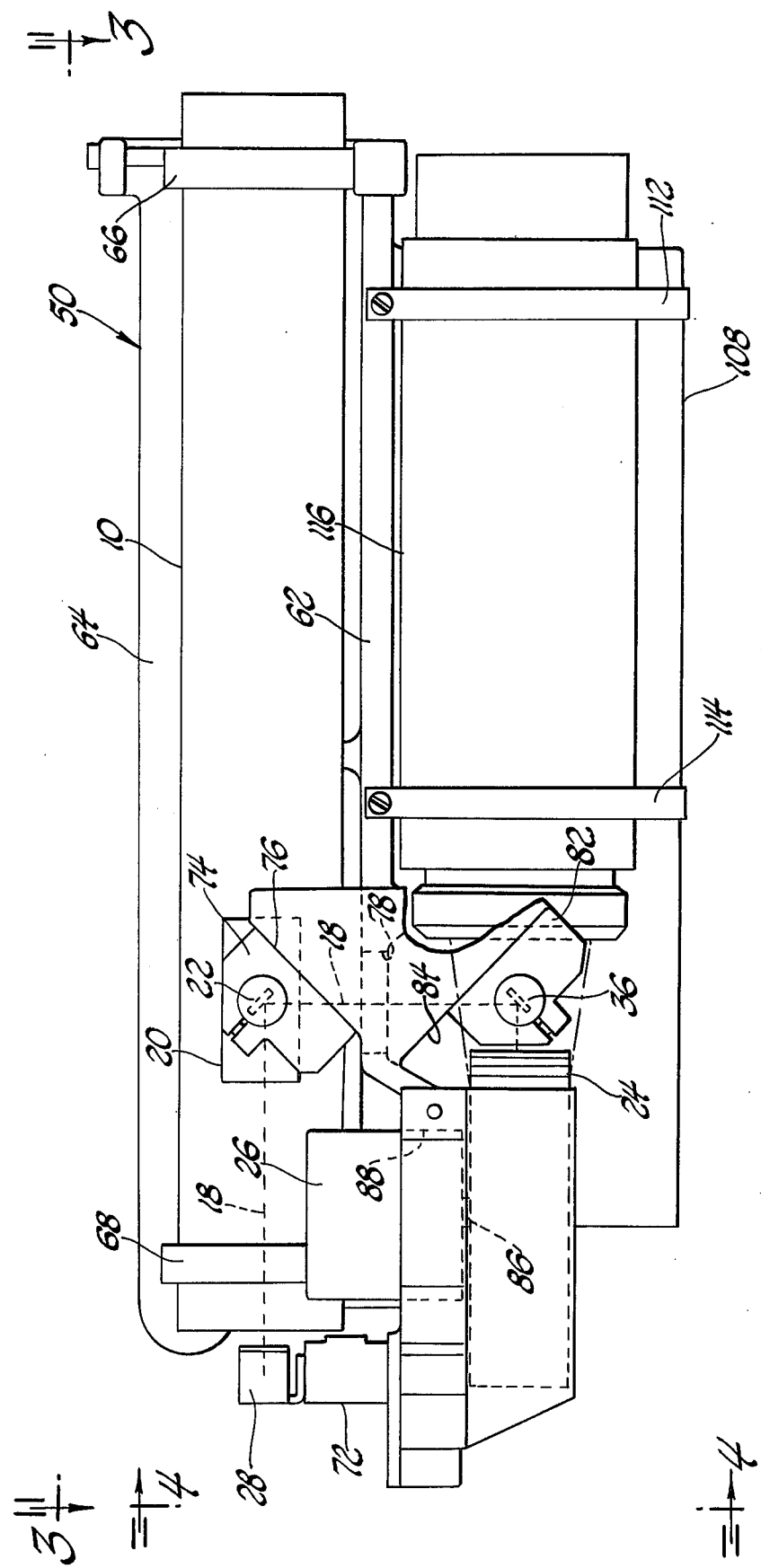
FIG. 2 shows the optical system in a view which may be regarded as an elevation view.

FIG. 2 is an elevation view looking at the scanner-receiver assembly in a direction normal to the axes of the laser 10 and the receiver 16. The laser 10 is supported upon the frame 50 by means of a horizontal shelf portion 62 and a vertical flange portion 64 through the intermediary of a rear adjusting clamp 66 and a front adjusting clamp 68. (The terms "horizontal" and "vertical" are used in a relative sense only since they are shown in that orientation in FIG. 2.) The laser 10 is disposed with its output or forward end adjacent the left-hand end of the frame 50 and the corner reflector 28 is disposed immediately adjacent the output end of the laser. The reflector 28 is mounted by a pedestal 72 upon a shelf portion 62 of the frame. It is noted that the laser beam 18, as shown in FIG. 3 first impinges upon mirror element 32 and is reflected thereby onto mirror element 34. The laser beam 18 then impinges upon the oscillatory mirror 22 of the electromechanical resonator 20. As best shown in FIG. 2, the resonator 20 is mounted by an adjustable clamping block 74 upon a ramp surface 76 formed integrally with the shelf portion 62. As viewed in FIG. 2, the beam 18 is reflected downwardly from the oscillatory mirror 22 through an opening 78 in the shelf portion 62 toward the post mirror 36. The post mirror 36 is supported by an adjustable clamping block 82 which is seated against a ramp surface 84 extending downwardly from the shelf portion 62. The post mirror 36 reflects the laser beam 18 onto the rotative multifaceted mirror 24.

The multifaceted mirror 24, as best shown in FIG. 2, is mounted for rotation upon the shaft 86 of the motor 26 which in turn is mounted in an opening 88 in the shelf portion 62.

Figure 5:
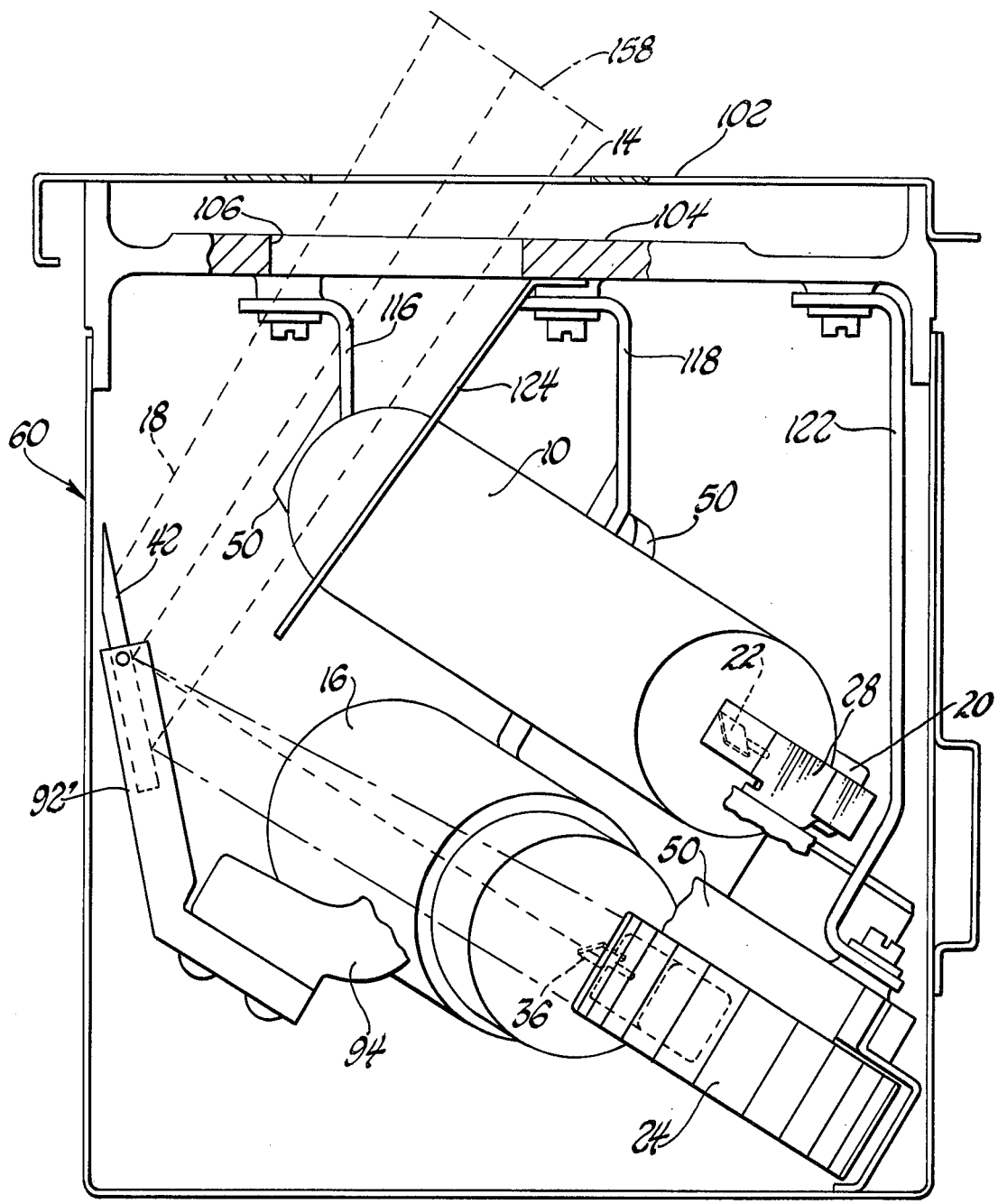
FIG. 5 is an end view of the optical system showing its orientation relative to the window.

The laser beam 18 is deflected by the multifaceted mirror onto the final folding mirror 42, as shown in FIG. 3. The mirror 42 is supported in trunnions 92 and 92' which in turn are supported upon the frame by an extension bracket 94. It is noted that the axis of the trunnions extends obliquely of the axis of the laser 10, as shown in FIG. 3. The laser beam 18 is reflected from the final folding mirror 42 into the window 14 which is mounted in the top wall 102 of the casing 60. This top wall 102 and the other walls of casing 60, as shown in FIG. 5, are supported upon a support member or hanger plate 104. The plate 104 is provided with an opening 106 to allow the scanning beam 18 to impinge upon the window 14.

As discussed above, the return light path from the window 14 to the receiver 16 extends from the code symbol being scanned through the window to the folding mirror 42 and thence to the multifaceted mirror 24 from which it is reflected to the receiver 16. The receiver 16 is mounted, as shown in FIGS. 2 and 3, below the shelf portion 62 upon a depending support flange 108 through the intermediary of adjusting clamps 112 and 114. The receiver 16 has its optical axis parallel with the optical axis of the laser 10 and perpendicular to the rotative axis of the multifaceted mirror 24. The axis of the receiver 16 is, however, offset from the axis of the multifaceted mirror and is aligned with a particular facet position occupied by facet 38 in the rotative position shown in the drawings. The receiver 16 will be described in greater detail below.

As shown in FIG. 5, the support frame 50 is mounted upon the hanger plate 104 by means of hanger brackets 116, 118 and 122. A light baffle 124, as shown in FIG. 5, is supported by the plate 104 and extends obliquely therefrom to block ambient light from the interior of the casing 60.

Figure 6:
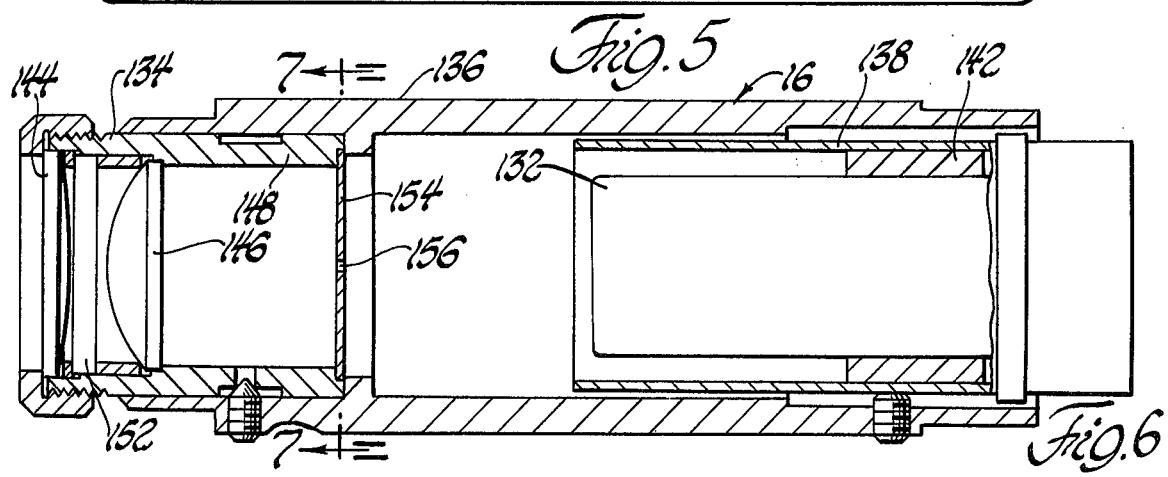
FIG. 6 shows the receiver.

Referring now to FIGS. 6 and 7, the receiver will be described in greater detail. The receiver 16 comprises a photo-detector 132, preferably a photomultiplier tube, and an optical assembly 134, both of which are mounted in a support tube or housing 136. The photomultiplier tube 132 is fixedly mounted in the rear end of the support tube 136 and is contained within a cylindrical magnetic shield 138 and retained in place by a cylindrical shield liner 142. The optical assembly 134 comprises a collecting lens 144 and a focusing lens 146, both of which are supported within a mount tube 148. A spectral filter 152 is disposed between the lenses 144 and 146 and is adapted to reject ambient light and to pass the laser light. At the rear end of the mount tube 148 an aperture plate of field stop 154 is mounted. The field stop, as shown more specifically in FIG. 7, includes a slit 156 which extends parallel to the rotation axis of the multifaceted mirror 24. The portion of the beam reflected from the code symbol during the beam scan is reflected back onto the multifaceted mirror in a divergent or diffuse manner. From the facet 38 the reflected energy is collected by the lens 144 and focused by the lens 146 through the field stop 154 onto the photomultiplier tube 132. The field stop 154 is effective to confine the light signal collection to the small area of the laser beam spot and thus minimize the ambient light impinging upon the photomultiplier. The post mirror 36, being disposed in the optical path between the multifaceted mirror and the receiver, has an area which is small relative to the cross-sectional area of the returned light and therefore little signal energy is lost by this obscuration in the path. The photomultiplier tube produces a train of electrical pulses corresponding to the alternation between light bars and dark bars in the code symbol as the scanning beam sweeps thereacross. The electrical pulses from the photomultiplier tube, which represent the data encoded on the symbol, are processed by decoding circuitry not shown.

Referring now to FIGS. 8 and 9, the optical layout of the components for the scanning beam path is shown. One of these figures, such as FIG. 8, may be regarded as a view of the beam path in one plane and the other as a view of the beam path in a plane normal to the first. It is noted that the optical layout includes physical components beginning with the laser 10 and ending with the window 14. For orientation purposes it is noted that FIG. 8 illustrates the beam scan at the window 14 along the minor axis $y$ and FIG. 9 illustrates the beam scan at the window 14 along the major axis $x$. Referring to FIGS. 8 and 9 together, the beam from the laser 10 extends to the mirror element 32 and thence to the mirror element 34 of the corner reflector 28. From the mirror element 34 the laser beam extends to the oscillatory mirror 22 of the resonator 20 and thence to the post mirror 36 from whence it passes to the multifaceted mirror 24. As indicated in FIG. 8, the oscillatory mirror 22 causes the beam 18 to be deflected along the minor axis such that the extremities of the scan motion along the minor axis are divergent from the mirror 22 to the mirror 24 and thence to the final folding mirror 42 from whence the beam is directed through the window 14. As indicated in FIG. 9, rotary multifaceted mirror 24 causes the beam to be deflected such that the extremities of the scan motion along the major axis are divergent onward from the mirror 24. The laser beam 18 has a plane of best focus or focal plane 158 which, due to the beam forming means in the laser 10, lies beyond the window 14. It is noted that this focal plane extends obliquely to the minor axis of the scan pattern and substantially parallel to the major axis of the scan pattern.

The optical layout of the return light path and components is shown in FIGS. 10 and 11. As discussed above, this path extends from the code symbol being scanned through the window 14 to the final folding mirror 42 and thence to the multifaceted reflector 24, from which the returned light is directed to the receiver 16.

In use of the subject invention, the scanner-receiver is adapted for under-counter installations with the top surface 102, which contains window 14, mounted flush with the counter-top. The requirement for installation space is small and the scanner-receiver, sometimes called the scanner head, is suitably connected by cable to the electronic apparatus adapted for control of the scanner and for processing of the video signal produced by the receiver. It is noted that the operator is merely required to move the coded package over the scanning window in any orientation which will allow the scanning beam to impinge upon the code symbol. The focal plane of the scanning beam is disposed obliquely to the plane of the window to facilitate both "side-reading" and "bottom-reading," i.e. with the code symbol on either the side or the bottom of the package.

Although the description of this invention has been given with reference to a particular embodiment, it is not to be construed in a limiting sense. Many variations and modifications will now occur to those skilled in the art. For a definition of the invention, reference is made to the appended claims.

The embodiments of the present invention in which an exclusive property or privilege is claimed are defined as follows:

1. An optical scanner for reading bar code symbols comprising, a scanning window adapted to receive a code symbol, a transmitted light beam path, a light beam source at the origin of the beam path for producing a light beam, first and second deflector means disposed serially in the light beam path for cyclically deflecting the beam along major and minor deflection axes respectively and for directing it onto the window, a return light path, a light receiving means at the terminus of the return light path, said code symbol adjacent said window being at the terminus of said light beam path and at the origin of the return light path, said return light path including said first deflector means whereby the image of said symbol represented by the return light from said symbol has no component of motion at the receiving means in a direction corresponding to the major deflection axis, said light receiving means including a light collecting lens, a field stop and a photodetector, said second deflection means being disposed out of the return light path, said field stop being disposed between the light collecting lens and the photodetector, said field stop defining a slit extending in a direction corresponding to said minor deflection axis whereby the slit passes to the photodetector only that portion of the return light which originates in a narrow band which extends along the minor axis at a position on the major axis where the light beam is impinging upon the code symbol.

2. The invention as defined in claim 1 wherein said first deflector means comprises a rotary multifaceted mirror.

3. The invention as defined in claim 2 wherein said second deflection means is an oscillatory mirror, a post mirror in the beam path between said oscillatory mirror and said multifaceted mirror, said post mirror being a reflector in the beam path for changing the direction of the beam by approximately a right angle, said post mirror also being in the return light path between said multifaceted mirror and said receiver and being an obscuration in the return light path, said post mirror having an area which is several times smaller than the cross-sectional area of the return light path at the post mirror.

4. The invention as defined in claim 3 wherein said light beam source is a laser, said laser and said receiving means being disposed with their optical axes substantially parallel, said rotary multifaceted mirror having a rotational axis perpendicular to the laser axis and having a facet aligned with the axis of the receiving means.

5. The invention as defined in claim 4 including a corner reflector in the beam path between the laser and the oscillatory mirror.

6. The invention as defined in claim 5 including a folding mirror in the beam path and the return light path between said multifaceted mirror and the window.

\* \* \* \* \*